(12) United States Patent
Sims et al.

(10) Patent No.: US 8,732,689 B2
(45) Date of Patent: May 20, 2014

(54) APPARATUS AND METHOD FOR UPGRADING LIGHTING CONTROLLERS

(75) Inventors: William F. Sims, Murfreesboro, TN (US); Jason Lien, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 889 days.

(21) Appl. No.: 12/711,468

(22) Filed: Feb. 24, 2010

(65) Prior Publication Data

US 2011/0209136 A1 Aug. 25, 2011

(51) Int. Cl.
*G06F 9/45* (2006.01)
*G06F 3/048* (2013.01)

(52) U.S. Cl.
USPC .......... 717/171; 717/168; 717/170; 717/172; 715/771

(58) Field of Classification Search
None
See application file for complete search history.

(56) References Cited

U.S. PATENT DOCUMENTS

| | | | | |
|---|---|---|---|---|
| 5,629,587 | A * | 5/1997 | Gray et al. | 315/292 |
| 6,295,541 | B1 | 9/2001 | Bodnar et al. | |
| 7,191,435 | B2 * | 3/2007 | Lau et al. | 717/168 |
| 7,369,060 | B2 | 5/2008 | Veskovic et al. | |
| 7,411,489 | B1 | 8/2008 | Elwell et al. | |
| 7,461,374 | B1 * | 12/2008 | Balint et al. | 717/174 |
| 8,196,133 | B2 * | 6/2012 | Kakumani et al. | 717/172 |
| 8,255,899 | B2 * | 8/2012 | Halliday | 717/172 |
| 2002/0144248 | A1 * | 10/2002 | Forbes et al. | 717/167 |
| 2002/0152298 | A1 * | 10/2002 | Kikta et al. | 709/223 |
| 2002/0174422 | A1 * | 11/2002 | Kelley et al. | 717/178 |
| 2003/0229890 | A1 * | 12/2003 | Lau et al. | 717/168 |
| 2004/0255291 | A1 * | 12/2004 | Sierer et al. | 717/174 |
| 2006/0010434 | A1 * | 1/2006 | Herzog et al. | 717/168 |
| 2006/0125426 | A1 | 6/2006 | Veskovic et al. | |
| 2006/0132065 | A1 * | 6/2006 | Sears et al. | 315/312 |
| 2007/0038983 | A1 * | 2/2007 | Stienhans | 717/127 |
| 2007/0155349 | A1 * | 7/2007 | Nelson et al. | 455/128 |
| 2007/0273307 | A1 | 11/2007 | Westrick et al. | |
| 2008/0028385 | A1 * | 1/2008 | Brown et al. | 717/170 |
| 2008/0092075 | A1 * | 4/2008 | Jacob et al. | 715/771 |
| 2008/0180270 | A1 | 7/2008 | Veskovic et al. | |
| 2008/0185977 | A1 | 8/2008 | Veskovic et al. | |
| 2008/0201702 | A1 * | 8/2008 | Bunn | 717/171 |
| 2009/0112895 | A1 * | 4/2009 | Halliday | 707/100 |
| 2009/0184840 | A1 | 7/2009 | Veskovic et al. | |
| 2009/0265699 | A1 * | 10/2009 | Toeroe | 717/168 |
| 2010/0121906 | A1 * | 5/2010 | Ku et al. | 709/202 |
| 2011/0246977 | A1 * | 10/2011 | Parsons et al. | 717/171 |

OTHER PUBLICATIONS

Alexander Dementjev et al., "A Consulting Module in Room Automation", [Online], 2004, pp. 1-6, [Retrieved from Internet on Jan. 3, 2014], <http://citeseerx.ist.psu.edu/viewdoc/download?doi=10.1.1.68.5460&rep=rep1&type=pdf>.*

(Continued)

*Primary Examiner* — Thuy Dao
*Assistant Examiner* — Ziaul A Chowdhury
(74) *Attorney, Agent, or Firm* — Lando & Anastasi, LLP

(57) ABSTRACT

A lighting system controller is provided that is adapted to upgrade a lighting controller with a software component having multiple upgrade dependencies. According to one example, the lighting system controller is configured to generate an upgrade plan based on the current configuration of the lighting controller and the upgrade dependencies associated with the software component. Further, according to this example, the lightings system controller executes the upgrade plan to install the software upon with the software component is dependent prior to installing the software component.

20 Claims, 8 Drawing Sheets

(56) References Cited

OTHER PUBLICATIONS

Slinger Jansen et al., "A Process Model and Typology for Software Product Updaters", [Online], IEEE 2005, pp. 1-10, [Retrieved from Internet on Jan. 3, 2014], <http://ieeexplore.ieee.org/stamp/stamp.jsp?tp=&arnumber=1402141>.*

Dominic White, "A Unified Architecture for Automatic Software Updates", [Online], Jun. 2004, pp. 1-11, [Retrieved from Internet on Jan. 3, 2014], <http://www.cs.ru.ac.za/research/g00w1690/files/issa2004.pdf>.*

Thomas Staub et al., "Secure Remote Management and Software Distribution for Wireless Mesh Networks", [Online], 2007, pp. 1-8, [Retrieved from Internet on Jan. 4, 2014], <http://cds.unibe.ch/research/pub_files/SBLB07.pdf>.*

* cited by examiner

APPARATUS AND METHOD FOR UPGRADING LIGHTING CONTROLLERS

BACKGROUND

1. Field of the Invention

At least one aspect in accord with the present invention relates generally to apparatus and processes for controlling illumination of lights, and more specifically, to apparatus and processes for upgrading lighting controllers with components having multiple dependencies.

2. Discussion of Related Art

Lighting is one of the largest consumers of electric power in a typical building, often exceeding 30% of the total energy cost. To better manage the energy costs associated with lighting, lighting control systems are typically used. Lighting control systems are designed to manage energy consumption while providing light, where and when it is needed. Conventional lighting control systems include lighting controllers that are capable of activating and deactivating remotely operated circuit breakers or switches according to a predefined schedule. For example, lighting control systems often adjust lighting in a building according to occupancy schedules associated with the various areas of the building, which are often partitioned into lighting zones. By controlling lights according to these schedules, lighting control systems can, in some installations, reduce energy costs associated with lighting by over 50%. Lighting control systems may also be used with occupancy sensors to control building lighting based on actual occupancy of areas of the building.

Lighting control systems provide additional benefits. For example, lighting control systems can increase the longevity of lamps and ballasts by reducing the number of burn hours incurred over a period of time. In addition, lighting control systems can be used to comply with many building code requirements.

SUMMARY OF THE INVENTION

Aspects in accord with the present invention demonstrate an appreciation that the administrative burden associated with lighting control systems is significant. For example, lighting control systems may include lighting controllers that require periodic upgrades to software components resident on the lighting controllers. Moreover, these lighting controllers typically have varying sets of hardware and software components already installed within them. With such a heterogeneous installed base, lighting control system administrators typically must create several different upgrade plans when deploying an upgrade to the installed base of lighting controllers. To help ease this burden, various examples provide for innovative approaches to installing new software components in a lighting control system.

According to various examples, a lighting control system includes a lighting system controller that is adapted to automatically account for the dependencies of software components when upgrading on one or more software components on one or more lighting controllers. In these examples, the lighting system controller is configured to provide an interface that allows an external entity, such as a user or external system, to target one or more lighting controllers for an upgrade and to select the upgrade to be applied to the targeted lighting controllers. According to these examples, an upgrade may include one or more software components and each of these software components may have dependencies on other hardware and software components. Upgrades as disclosed herein may initially install one or more software components or may change the installed version of one or more software components from its current version to any other version. Thus upgrades may upgrade, update or patch one or more software components, and exemplary upgrades disclosed herein are not limited by the amount of change introduced to the software components by the upgrade. Examples disclosed herein track these dependencies and, prior to installing the selected upgrade, automatically upgrade additional components resident on the light lighting controllers as required to satisfy the dependencies of the selected upgrade.

According to one example, a method for upgrading a lighting controller is provided. The method includes acts of identifying a software component with a plurality of upgrade dependencies, the software component being natively executable by the lighting controller, each of the plurality of upgrade dependencies specifying a supporting software component upon which the software component is dependent, generating an upgrade plan based at least in part on the upgrade dependencies and executing the upgrade plan to install each supporting software component prior to installing the software component.

In the method, the act of identifying the software component may include an act of identifying at least one of a boot module for a lighting controller, a download module and an application module. In addition, the act of generating the upgrade plan may include an act of generating an upgrade plan that includes an ordered sequence of upgrades. Moreover, the act of executing the upgrade plan may include an act of creating a single file that includes the software component and each supporting software component.

The method may include an act of providing the single file to the lighting controller via a network. In addition, the method may include an act of providing a request for configuration management information to the lighting controller. In the method, the act of providing the request may include providing a request for configuration management information for each component installed in the lighting controller. Furthermore, in the method, the act of providing the request may include an act of providing a request for configuration management information for a subset of components installed in the lighting controller. Moreover, the method may include an act of receiving a response to the request, wherein generating the upgrade plan includes generating an upgrade plan based at least in part on the upgrade dependencies and the response.

According to another example, a lighting system controller is provided that includes a network interface, a memory and a controller coupled to the network interface and the memory. In this example, the processor is configured to identify a software component with a plurality upgrade dependencies, the software component being natively executable by the lighting controller, each of the plurality of upgrade dependencies specifying a supporting software component upon which the software component is dependent, generate an upgrade plan based at least in part on the upgrade dependencies and execute the upgrade plan to install each supporting software component prior to installing the software component.

In the lighting system controller, the controller configured to identify the software component may be further configured to identify at least one of a boot module, a download module and an application module. In addition, the controller configured to generate the upgrade plan may be further configured to generate an upgrade plan that includes an ordered sequence of upgrades. Further, the controller configured to execute the upgrade plan may be further configured to create a single file that includes the software component and each supporting software component. Moreover, the controller may be further configured to provide the single file to the lighting controller via a network. Additionally, the controller may be further configured to provide a request for configuration management information to the lighting controller. The request may include a request for configuration management information for each component installed in the lighting controller, or the request may include a request for configuration management information for a subset of components installed in the lighting controller. Furthermore, the controller may be further configured to receive a response to the request and the controller configured to generate the upgrade plan may be further configured to generate an upgrade plan based at least in part on the upgrade dependencies and the response. Also, the controller may be further configured to report a result of executing the upgrade plan, the result indicating either success or failure.

According to another example, a lighting system controller is provided that includes a network interface, a memory and a mechanism for upgrading a software component on a lighting controller, the software component having a plurality upgrade dependencies, each of the plurality of upgrade dependencies specifying a supporting software component upon which the software component is dependent.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
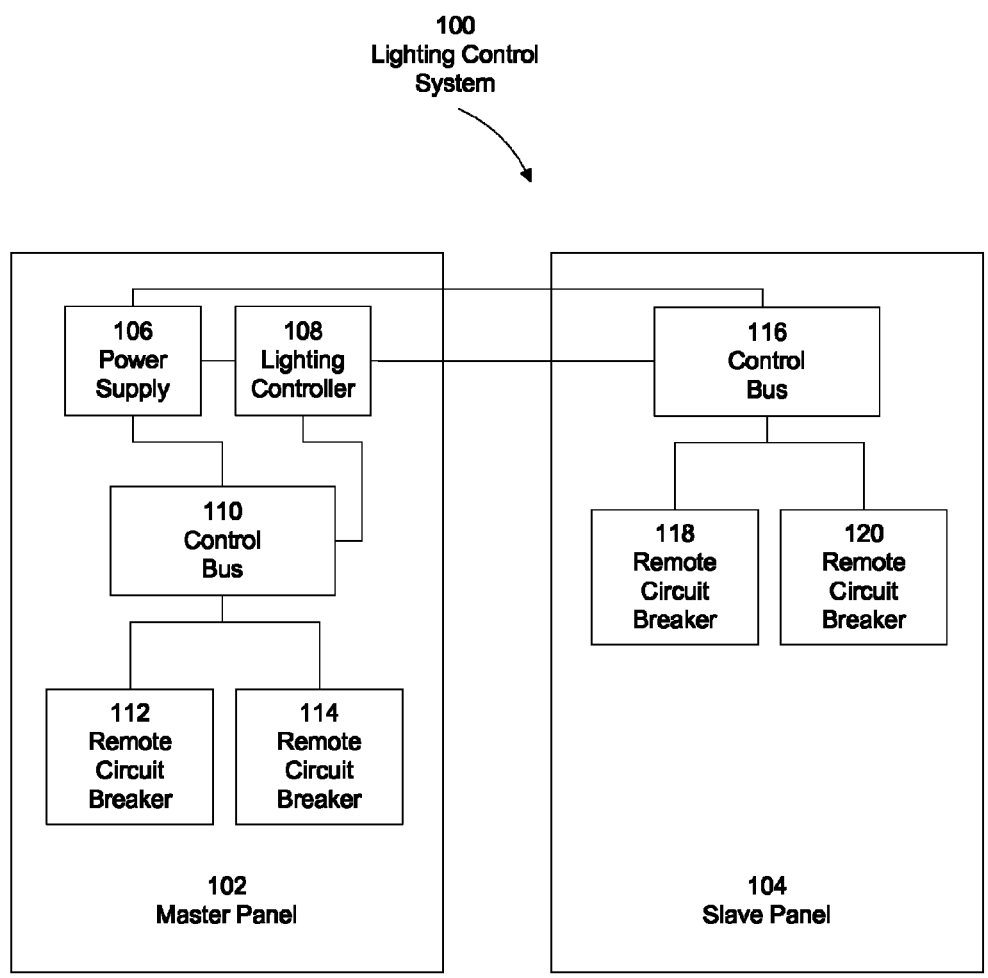
FIG. 1 is a block diagram of an example of a lighting control system.

At least some aspects and examples relate to apparatus and processes that allow lighting control system administrators to easily upgrade software components with multiple dependencies. According to these examples, the software components are resident on one or more lighting controllers. For instance, in some examples, a lighting control system includes a lighting system controller that can receive a selected upgrade and a targeted lighting controller from an external entity and store the selection in local storage. Additionally, in these examples, the lighting system controller can gather configuration management information from the targeted lighting controller via a configuration management interface. This configuration management information may include any information that describes the hardware and software components that constitute the lighting controller, as well as the version of each such component. According to some examples, the lighting system controller can use the configuration management information, in conjunction with the dependencies of the targeted component, to automatically generate and execute an upgrade plan. Thus, examples allow for the application of complex software upgrades to lighting controllers without requiring a detailed analysis of component dependencies by the lighting control system administrator.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the apparatus and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatus and methods or their components to any one positional or spatial orientation.

Lighting Control Systems

The lighting control systems disclosed herein provide a variety of features that allow for precise control of lighting and other controlled loads. In some examples, lighting control systems includes external device inputs that can interface with external devices such as external time clocks, access readers, photocell controls, occupancy sensors and other building automation or security systems to exchange (i.e. receive or provide) information pertaining to the power control activities of the lighting control system. In at least one such example, the lighting control system is configured to activate or deactivate lights upon receipt of a notification (such as a dry-contact closure or a digital serial communication) from an external control device (such as a time clock). In other examples, the lighting control system includes a time clock and scheduler and may be configured to perform power control functions according to a default schedule and to adjust these power control functions to account for special events, daylight saving time and sunrise and sunset times for particular geographic locations. One example of a lighting control system 100 that may be configured to include these features is illustrated in FIG. 1.

As shown, the lighting control system 100 includes a master panel 102 and a slave panel 104. The master panel 102 includes a power supply 106, a lighting controller 108, a control bus 110 and remote circuit breakers 112 and 114. The slave panel 104 includes a control bus 116 and remote circuit breakers 118 and 120. In the arrangement shown, the master panel 102 controls the power supplied to various controlled loads (such as lights) via itself and the slave panel 104.

More particularly, in the example of FIG. 1, the power supply 106 provides operating power to the lighting controller 108 and the control busses 110 and 116. In addition, the lighting controller 108 includes facilities configured to control the operation of the remote circuit breakers 112, 114, 118 and 120 via the control busses 110 and 116. As shown, the lighting controller 108 transmits control signals to the control busses 110 and 116. These control signals may be transmitted via data cable (such as 4-wire, Class 1 communications cable).

Continuing this example, the control busses 110 and 116 receive operating power from the power supply 106 and control signals from the lighting controller 108. The control busses 110 and 116, in turn, further distribute the control signals (for example, via switching signals) and operating power to the remote circuit breakers 112, 114, 118 and 120. The remote circuit breakers 112, 114, 118 and 120 receive the operating power and the control signals from the control busses 110 and 116 and control the flow of power used by the controlled loads according to the control signals. In some examples, the remote circuit breakers 112, 114, 118 and 120 control the flow of power used by the controlled loads by completing or breaking a circuit including the controlled load and the source of power to the controlled load. In these examples, the source of power to the controlled load is the main power feed for the facility in which the lighting control system is installed, such as a utility power feed. Thus, the lighting control system 100 provides for centralized control of controlled loads by the lighting controller 108.

The components depicted in FIG. 1 may be selected from many suitable lighting control system components known in the art. In one example, the power supply 106, the lighting controller 108, the control busses 110 and 116 and the remote circuit breakers 112, 114, 118 and 120 are Square D® Powerlink® brand lighting control system components available from Schneider Electric. However, other examples may use other components and examples are not limited to a particular component or component manufacturer.

Lighting System Controller

Figure 2:
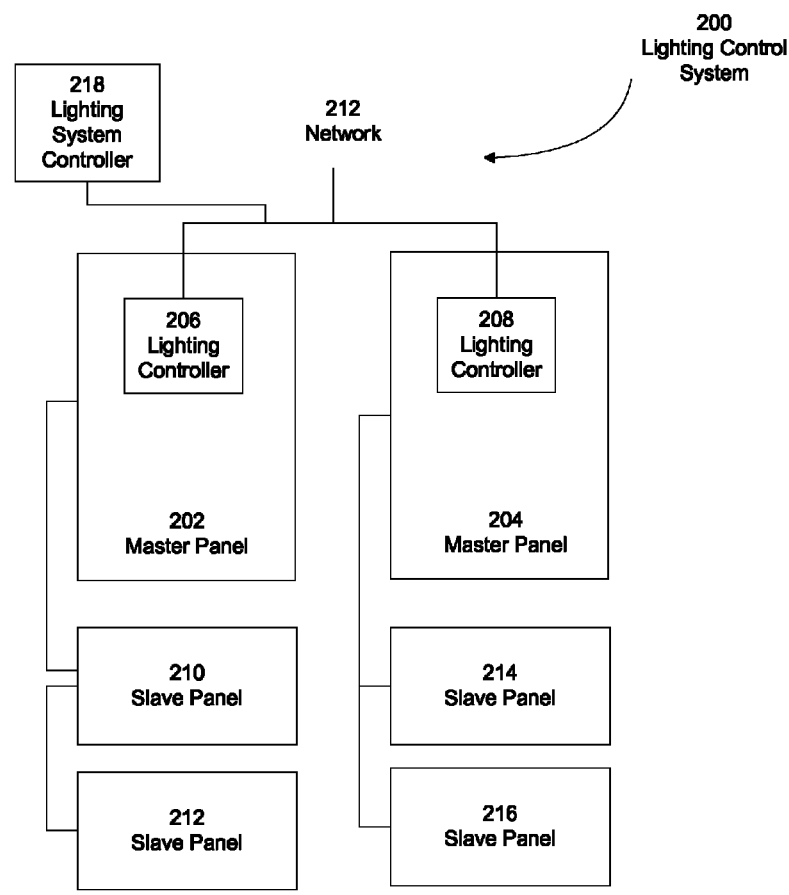
FIG. 2 is a block diagram of another example of a lighting control system.

FIG. 2 illustrates a more sophisticated lighting control system 200 that includes a lighting system controller 218, a network 212, master panels 202 and 204 and slave panels 210, 212, 214 and 216. The lighting control system 200 is one example of a system that is specially configured to perform the functions disclosed herein. However, the system structure and content discussed herein with regard to FIG. 2 are for exemplary purposes only and are not intended to limit other examples to the specific structure shown in FIG. 2. As will be apparent to one of ordinary skill in the art, many variant system structures can be architected without deviating from the substance of the examples disclosed herein. As shown, the master panels 202 and 204 respectively include lighting controllers 206 and 208. The remaining details of the master panels 202 and 204 and the slave panels 210, 212, 214 and 216 are not shown, but these panels are arranged, and function, in the manner discussed above regarding master panel 102 and slave panel 104.

According to this example, the lighting system controller 218 is coupled to the lighting controllers 206 and 208 by the network 212. The network 212 may include any communication network through which lighting control system components may exchange data. Particular examples of networking standards that the network 212 may support include communication protocols such as C-BUS™ and TCP/IP over Ethernet and serial protocols, such as Modbus® ASCII/RTU, DMX512 and JCI-N2. In various examples, the light system controller 218 exchanges a variety of information with the lighting controllers 206 and 208 using the network 212. In some examples discussed further below, the information exchanged includes configuration management information, among other information.

In the example shown, the lighting system controller 218 includes elements configured to exchange and store a variety of information with the lighting controllers 206 and 208 or with external entities. Examples of the types of information that may be so exchanged include monitoring information, control information, diagnostic information, maintenance information and configuration information. The monitoring information may include detailed circuit breaker, zone, external device input, schedule and remote source information for each panel, such as the panel name and layout, circuit breaker names and numbers, and the current status of the circuit breaker (for example, ON, OFF or tripped). The control information may include information to activate or deactivate command zone overrides and external device inputs. The diagnostics information may include a panel summary that displays the panel address, control bus names, numbers, firmware versions and current operating states. In addition the diagnostic information may include a lighting controller summary that includes model number, firmware version, time clock information, communications status and information regarding the current operating environment. The maintenance information may include product support and technical support contact information. The configuration information may include any information used by the lighting system controller 218 to configure itself, or configuration information associated with managed lighting controllers, such as lighting controllers 206 and 208.

Figure 3:
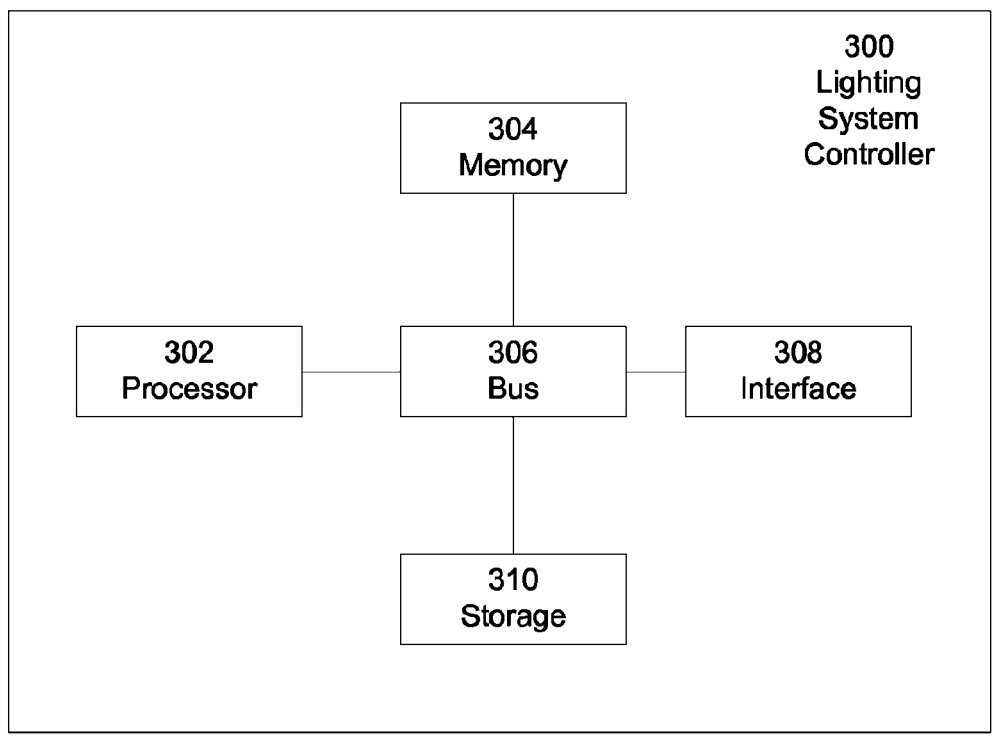
FIG. 3 is a block diagram of an exemplary lighting system controller within which various aspects in accord with the present invention may be implemented.

FIG. 3 shows a more detailed example of a lighting system controller 300. As shown, the lighting system controller 300 includes hardware and software specially configured to perform the various aspects and functions described herein. In this example, the lighting system controller 300 includes a processor 302, a memory 304, a bus 306, an interface 308 and a storage 310. The processor 302 can perform a series of instructions that result in manipulated data. The processor 302 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 302 is connected to other system elements, including one or more memory devices 304, by the bus 306.

The memory 304 may be used for storing programs and data used during operation of the lighting system controller 300. The memory 304 may include any volatile or non-volatile storage device, such as a dynamic random access memory or a disk drive or combinations of these devices. Various examples may organize the memory 304 into particularized and, in some cases, unique structures to perform the functions disclosed herein.

Components of the lighting system controller 300 may be coupled by an interconnection element such as the bus 306. The bus 306 may include one or more physical busses, for example, busses between components that are integrated within a same machine, but may include any communication coupling between system elements including specialized or standard computing bus technologies such as IDE, SCSI, PCI and InfiniBand. Thus, the bus 306 enables communications, for example, data and instructions, to be exchanged between system components of the lighting system controller 300.

The lighting system controller 300 also includes one or more interfaces 308 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, serial ports, etc. In at least one example, the lighting system controller 300 includes an RS-485 port, an RS-232 port and an Ethernet card. Interface devices allow the lighting system controller 300 to exchange information and communicate with external entities, such as users and other systems.

The storage system 310 may include a computer readable and writeable nonvolatile data storage medium in which instructions are stored that define a program that may be executed by the processor 302. The storage system 310 also may include information that is recorded, on or in, the medium, and this information may be processed by the processor 302 during execution of the program. More specifically, the information may be stored in one or more data structures specifically configured to conserve storage space or increase data exchange performance. The instructions may be persistently stored as encoded signals, and the instructions may cause the processor 302 to perform any of the functions described herein. The medium may, for example, be optical disk, magnetic disk or flash memory, among others. In operation, the processor 302 or some other controller may cause data to be read from the nonvolatile recording medium into another memory, such as the memory 304, that allows for faster access to the information by the processor 302 than does the storage medium included in the storage system 310. The memory may be located in the storage system 310 or in the memory 304, however, the processor 302 may manipulate the data within the memory 304, and then copy the data to the medium associated with the storage system 310 after processing is completed. A variety of components may manage data movement between the medium and integrated circuit memory element and examples is not limited thereto. Further, examples are not limited to a particular memory system or storage system.

Although the lighting system controller 300 is shown by way of example as one type of system upon which various aspects and functions may be practiced, aspects are not limited to being implemented on the lighting system controller 300 as shown in FIG. 3. Various aspects and functions may be practiced on one or more lighting system controllers having different architectures or components than those shown in FIG. 3. For instance, the lighting system controller 300 may include specially programmed, special-purpose hardware, such as for example, an application-specific integrated circuit (ASIC) tailored to perform a particular operation disclosed herein.

The lighting system controller 300 may include an operating system that manages at least a portion of the hardware elements included in the lighting system controller 300. Usually, a processor or controller, such as the processor 302, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 302 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform their described functions.

Lighting controllers, such as lighting controllers 206 and 208, may include a variety of hardware and software components. For example, the installed base of lighting controllers within a lighting control system may include various lighting controller models, each with different versions of hardware and software components. In at least one example, these software components include a boot module, a download module and an application module. According to some examples, each of these modules is compiled to be natively executable by the lighting controller.

According to this example, the boot module, also referred to as firmware, is loaded first by the lighting controller and provides basic operating system services to the subsequently loaded software components. Further, in this example, the download module provides a robust, fault tolerant communications interface through which the lighting controller can communicate with other systems, such as lighting system controllers, via a network. Furthermore, according to this example, the application module supports user mode functionality, such as controlling remote circuit breakers through control busses as described above with regard to FIG. 1. Each of these software components may have multiple versions and each version may be dependent on other versions of lighting controller hardware and software components for proper installation and operation.

According to a variety of examples, software components of a lighting controller are periodically upgraded. In these examples, the lighting system controller 300 includes elements configured to provide an upgrade management interface through which external entities (such as users or external systems) may target one or more lighting controllers for an available upgrade. In these examples, the lighting system controller 300 can store available upgrades in a variety of data structures within local storage, such as the memory 304 or the storage 310. The upgrades may include one or more software components. In addition, the upgrades may include indications of the hardware and software dependences of the software components included in the upgrade. As is discussed further below, these hardware and software dependencies may be used by the lighting system controller to determine changes to the configuration of a lighting controller that are required to support the software components included in a particular upgrade.

According to one example, the lighting system controller 300 is configured to present the upgrade management interface to a user. In this example, the upgrade management interface can display a list of available upgrades and a list of lighting controllers that are managed by the lighting system controller. According to this example, the lighting control system can receive a selection from the user that indicates an upgrade that the user wishes to deploy. Further, according to this example, the lighting control system can receive a selection from the user that indicates one or more lighting controllers that are the targets for the deployment.

Referring back to FIG. 2, according to other examples, the lighting system controller 218 includes elements configured to gather, via the network 212, configuration information applicable to the lighting controllers targeted for an upgrade. In some examples, the lighting system controller 218 issues a request for configuration management information to the lighting controllers targeted for deployment via a configuration management interface. The configuration management information request may include indications of one or more software or hardware components for which configuration management information is sought or may request configuration management information for all resident components. In addition, according to this example, the lighting controllers responds to the request with configuration management information detailing component and version information for the hardware and software components that are resident on the lighting controller. In one example, the response includes configuration management information for each component installed in the lighting controller. In another example, the response includes configuration management information only for those components indicated in the request.

According to various examples, a lighting system controller, such as the lighting system controller 218, includes elements configured to automatically prepare a lighting controller, such as lighting controller 206, for successful installation of a targeted software component by upgrading software components that support the targeted software component. For instance, according to some examples, the lighting system controller 218 can retrieve, from local storage, upgrade dependency information for each version of each deployable software component. This upgrade dependency information may include, for each software component, a list of hardware and software components that support the installation and operation of the software component. In these examples, the lighting system controller 218 is configured to use the upgrade dependency information to build an upgrade plan which details one or more software upgrades that will progress the configuration of the lighting controller from its current state to the targeted state, i.e. the configuration including the targeted software component. Table 1 shows one example of dependency information.

TABLE 1

Example of Dependency Information

| Component | Version | Supporting Component | Supporting Version |
|---|---|---|---|
| application module | 4.1 | boot module | 1.5 |
| application module | 4.1 | Download module | Any |
| download module | 1.1 | boot module | Any |
| boot module | 1.5 | boot module | 1.0 |
| boot module | 1.0 | NF2000G3 model | 1.0 |

According to this example, the boot module, version 1.0, depends on the hardware component NF2000G3, version 1.0. Similarly, the boot module, version 1.5, depends on the boot module, version 1.0, download module 1.1 depends on the presence of the boot module (any version) and the application module, version 4.1, depends on the presence of the download module, and the boot module, version 1.5. As shown in Table 1, the application module has multiple direct and indirect dependencies.

Continuing the example illustrated in Table 1, Table 2 illustrates an upgrade plan for a lighting controller currently configured with boot module 1.0, no download module and application module 4.0.

TABLE 2

Example of an Upgrade Plan

| Component | Version | Order |
|---|---|---|
| boot module | 1.5 | 1 |
| Download module | 1.1 | 2 |
| application module | 4.1 | 3 |

According to this upgrade plan, the boot module is first upgraded from version 1.0 to version 1.5, then the download module 1.1 is installed and lastly the application module is upgraded from version 4.0 to version 4.1.

Also, in some examples, the lighting system controller 218 has elements configured to execute the upgrade plan. According to these examples, the lighting controller 218 can generate a file including all of the software components listed in the upgrade plan and can forward the file to the lighting controller. Further, in these examples, the lighting system controller 218 can issue a series of upgrade commands to the lighting controller via the configuration management interface that cause the light lighting controller to execute each upgrade required by the upgrade plan.

The interfaces disclosed herein exchange information with various providers and consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the lighting control system 200 or unauthorized access to the lighting control system 200.

Configuration Synchronization Processes

Figure 4:
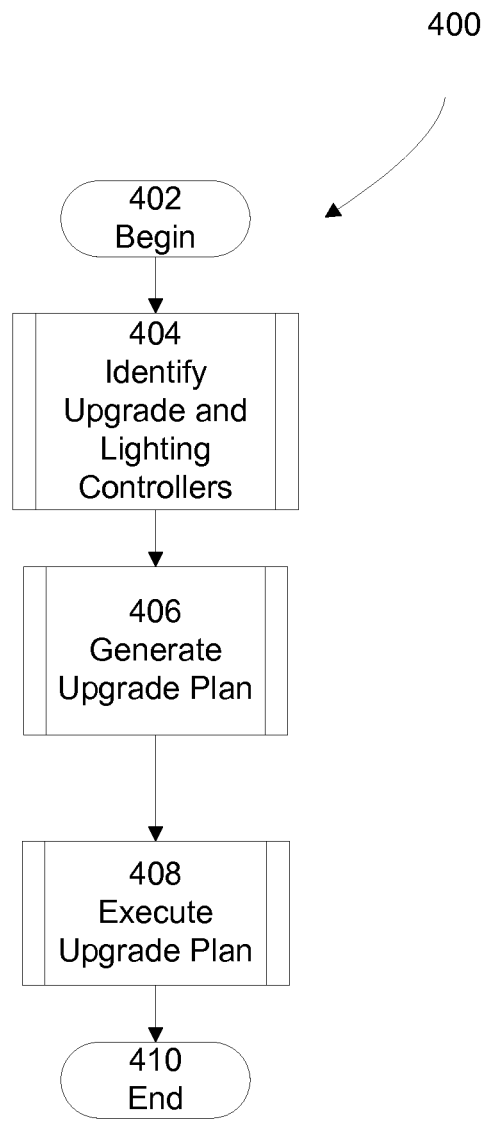
FIG. 4 is a flow chart of an exemplary process for upgrading lighting controller components with multiple upgrade dependencies.

Various examples provide processes for upgrading lighting controller components with multiple upgrade dependencies. According to some examples, the lighting system controllers 218 and 300, discussed above, are configured to perform the upgrade via a network. FIG. 4 illustrates one such process 400 that includes acts of identifying the upgrade and the lighting controller that is the target for the upgrade, generating an upgrade plan and executing the upgrade plan.

In act 404, an upgrade and a lighting controller are identified. According to some examples, an external entity interacts with a lighting system controller to identify the upgrade and the lighting controller. Acts in accord with these examples are discussed below with reference to FIG. 5.

In act 406, an upgrade plan is generated. According to various examples, a lighting controller system generates the plan based on the current configuration of the identified lighting controller and the identified upgrade. Acts in accord with these examples are discussed below with reference to FIG. 6.

In act 408, an upgrade is executed. According to several examples, a lighting system controller deploys the identified upgrade to the identified lighting controller using a network. Acts in accord with these examples are discussed below with reference to FIG. 7.

Automated configuration processes in accord with process 400 decrease the expertise required to deploy upgrades including components with multiple upgrade dependencies by automatically identifying the components that are needed to successfully install a targeted component and installing the components according to the structure of dependencies. Thus, processes like process 400 decrease the total cost associated with operating a lighting control system.

Figure 5:
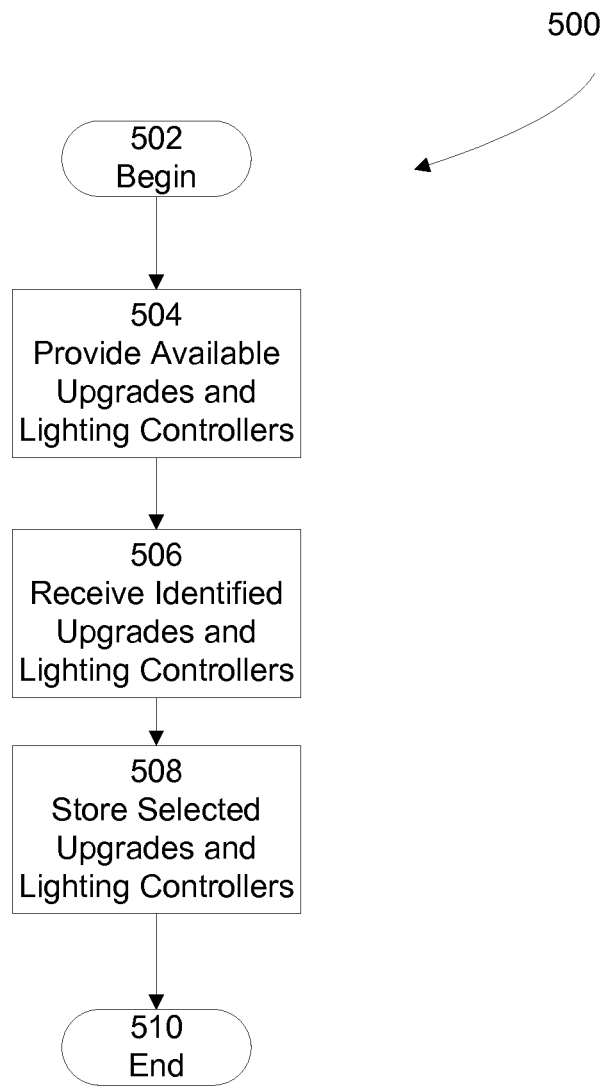
FIG. 5 is a flow chart of an exemplary process for identifying an upgrade and a lighting controller targeted for the upgrade.

As discussed above with regard to act 404 shown in FIG. 4, various examples provide processes for identifying an upgrade to deploy to one or more lighting controllers. FIG. 5 illustrates one such process 500 that includes acts of providing available upgrades and lighting controllers to an external entity, receiving an identified upgrade and lighting controllers from the external entity and storing selected the upgrades and lighting controllers identified by the external entity in local storage.

In act 504, a lighting system controller presents an upgrade management interface to an external entity. In some examples, the upgrade management interface provides access to upgrades that are available in local storage. In addition, according to these examples, the upgrade management interface provides access to lighting controllers that are managed by the lighting system controller.

In act 506, a lighting system controller receives an indication of an upgrade and one or more lighting controllers that are targeted for the upgrade. In some examples, the lighting system controller receives the indication via the upgrade management interface. In act 508, a lighting system controller stores the indication in local storage for future processing.

Various examples in accord with the process 500 enable lighting system controllers to identify upgrades and lighting controllers targeted for deployment of the upgrade. Thus, processes like process 500 provide a simple interface to allow users to enact complex upgrade activities.

Figure 6:
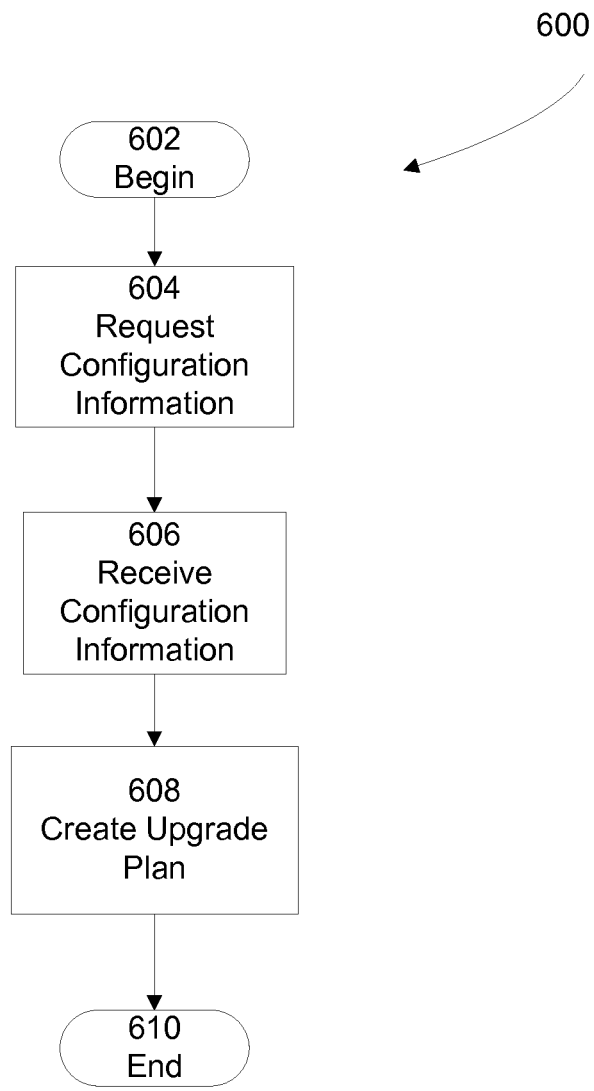
FIG. 6 is a flow chart of an exemplary process for generating an upgrade plan for the identified upgrade and the targeted lighting controller.

As discussed above with regard to act 406 shown in FIG. 4, various examples provide processes for generating a plan to upgrade one or more lighting controllers. FIG. 6 illustrates one such process 600 that includes acts of requesting configuration management information from one or more lighting controllers, receiving the requested configuration management information, and creating the upgrade plan.

In act 604, a lighting system controller requests configuration management information from one or more lighting controllers. In some examples, the lighting system controller requests the configuration management information via a configuration management interface. In other examples, the configuration management information requested by the lighting system controller depends on the upgrade being deployed. For instance, in one example, the lighting system controller requests only the configuration management information required to generate an upgrade plan for the components targeted for deployment. In other examples, the request includes an indication that version information for all components is requested.

In act 606, a lighting system controller receives a response including configuration management information from one or more lighting controllers. In some examples, the lighting system controller requests the configuration management information via a configuration management interface. According to one example, the configuration management information received includes version information for the components specified in the request issued in act 604.

In act 608, a lighting system controller creates an upgrade plan. In various examples, the upgrade plan is based on the current configuration of the lighting system controllers and the dependency information applicable to the target software component. As discussed above, the upgrade plan lists a sequence of upgrades for each lighting controller that will move the configuration of the lighting controller from its current state to the target state, i.e. a configuration that includes the targeted software component.

Processes in accord with the process 600 allow a lighting system controller to create an upgrade plan that automatically accounts for the dependencies of the targeted software component. By shielding users from the complexities of multiple upgrade dependencies, processes in accord with process 600 allow for more reliable and efficient planning of upgrade processes.

Figure 7:
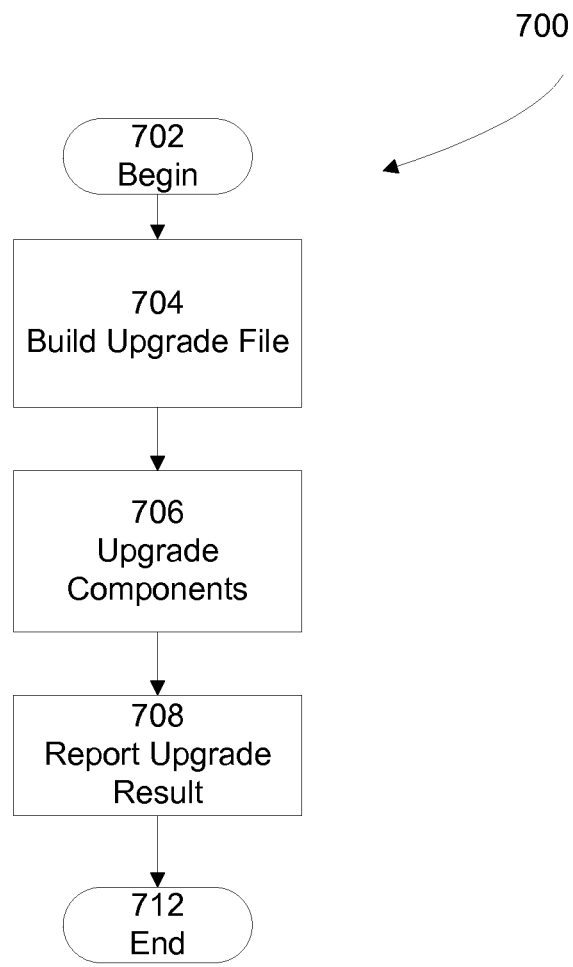
FIG. 7 is a flow chart of an exemplary process for executing the upgrade plan.

As discussed above with regard to act 408 shown in FIG. 4, various examples provide processes for a lighting system controller to deploy upgrades of components with multiple dependencies to one or more lighting controllers. FIG. 7 illustrates one such process 700 that includes acts of building an upgrade file, upgrading components and reporting upgrade results.

In act 704, a lighting system controller builds one or more upgrade files that include the target software components and supporting software components. According to some examples, the lighting system controller creates a single upgrade file containing the information required to upgrade all of the components listed in the upgrade plan. In other examples, multiple upgrade files are created.

In act 706, the lighting system controller upgrades the lighting controller according to the upgrade plan. In one example, the lighting system controller provides the upgrade file to the lighting controller. According to this example, the lighting system controller then issues commands to the lighting controller that cause the lighting controller to perform a sequence of upgrades using the components included in the upgrade file.

In act 708, the lighting system controller reports a result of the upgrade plan. According to one example, the upgrade result includes an indication of whether or not the upgrade was successful and, if the upgrade was not successful, an indication as to the error encountered. In this example, the upgrade result is provided to the external entity that requested the upgrade.

Upon completion of process 700, the lighting system controller has enabled external entities to upgrade software components with complex, multiple upgrade dependencies via simple interface. Processes in accord with process 700 allow external entities to efficiently upgrade software components on lighting controllers without learning intricate dependency structures or issuing multiple upgrade requests. Thus, processes in accord with process 700 decrease the difficulties encountered in upgrading the components of lighting control systems.

Figure 8:
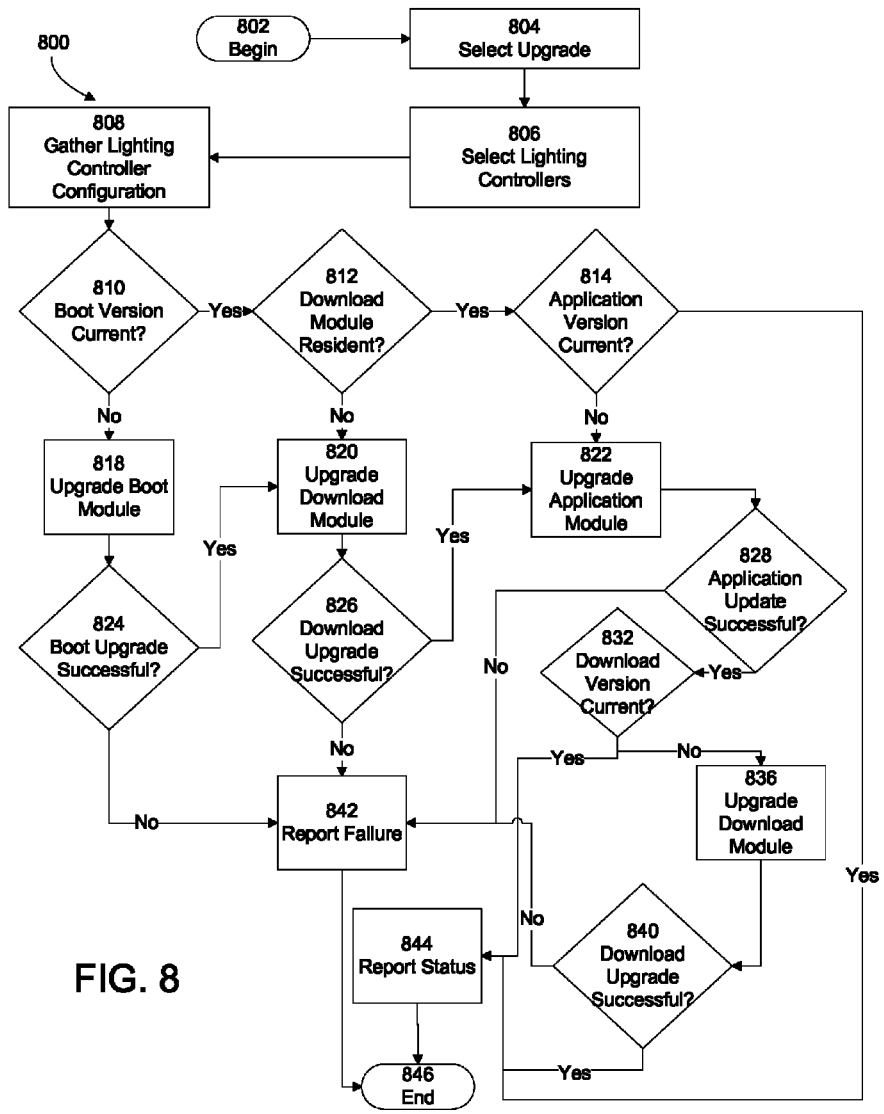
FIG. 8 is a block diagram of another exemplary process for executing an upgrade plan.

FIG. 8 illustrates another example process 800 for deploying lighting controller software with multiple upgrade dependencies. Process 800 begins at 802. In act 804, an external entity, such as a user, selects an upgrade to deploy using the functions and interfaces described herein with regard to a lighting system controller. In act 806, an external entity, such as a user, selects one or more lighting controllers targeted for deployment of the upgrade.

In act 808, the lighting system controller gathers configuration information from the targeted lighting controllers. According to one example, the lighting system controller issues a request for configuration information to the targeted lighting controllers via the configuration management interface. In this example, the targeted lighting controllers receive the request via the reciprocal configuration management interface and respond to the request by providing the requested configuration management information to the lighting system controller. Further, according to this example, the lighting system controller receives the response data and stores the response data in local storage. The response data may include a variety of configuration management information, such as a list of installed hardware and software components and version information associated with the installed components.

In act 810, the lighting system controller compares version information for the boot module included in the response data to the version information of the boot module associated with upgrade. If the boot version information included in the response data matches the boot version information associated with the upgrade, the lighting system controller proceeds to act 812. If the boot version information included in the response data does not match the boot version information associated with upgrade, the lighting system controller proceeds to act 818.

In act 812, the lighting system controller examines the response data to determine whether the download module is resident on the lighting controller that provided the response data. If the download module is resident on the lighting controller, the lighting system controller proceeds to act 814. If the download module is not resident on the lighting controller, the lighting system controller proceeds to act 820.

In act 814, the lighting system controller compares version information for the application module in the response data to the version information of the application module associated with upgrade. If the application version information included in the response data matches the application version information associated with the upgrade, the lighting system controller proceeds to act 844. If the application version information included in the response data does not match the application version information associated with upgrade, the lighting system controller proceeds to act 822.

In act 818, the lighting system controller upgrades the boot module resident on the lighting controller. In this example, the lighting system controller provides the boot module associated with the upgrade to the lighting controller. Then, according to this example, the lighting system controller issues a command to the lighting controller to upgrade to the provided boot module. Additionally, in this example, the lighting system controller receives an upgrade response from the lighting controller. The upgrade response may include a variety of information regarding installation of the upgrade, including an indication of whether or not the boot module was upgraded successfully.

In acts 820 and 836, the lighting system controller upgrades the download module resident on the lighting controller. In this example, the lighting system controller provides the download module associated with the upgrade to the lighting controller. Then, according to this example, the lighting system controller issues a command to the lighting controller to upgrade to the provided download module. Additionally, in this example, the lighting system controller receives an upgrade response from the lighting controller. The upgrade response may include a variety of information regarding installation of the upgrade, including an indication of whether or not the download module was upgraded successfully.

In act 822, the lighting system controller upgrades the application module resident on the lighting controller. In this example, the lighting system controller provides the application module associated with the upgrade to the lighting controller. Then, according to this example, the lighting system controller issues a command to the lighting controller to upgrade to the provided application module. Additionally, in this example, the lighting system controller receives an upgrade response from the lighting controller. The upgrade response may include a variety of information regarding installation of the upgrade, including an indication of whether or not the application module was upgraded successfully.

In act 824, the lighting system controller examines the upgrade response to determine if the lighting controller upgraded the boot module successfully. If so, the lighting system controller proceeds to act 820, as discussed above. If not, the lighting system controller proceeds to act 842.

In act 826, the lighting system controller examines the upgrade response to determine if the lighting controller upgraded the download module successfully. If so, the lighting system controller proceeds to act 822, as discussed above. If not, the lighting system controller proceeds to act 842.

In act 828, the lighting system controller examines the upgrade response to determine if the lighting controller upgraded the application module successfully. If so, the lighting system controller proceeds to act 832. If not, the lighting system controller proceeds to act 842.

In act 832, the lighting system controller compares version information for the download module in the response data to the version information of the download module associated with upgrade. If the download version information included in the response data matches the download version information associated with the upgrade, the lighting system controller proceeds to act 844. If the download version information included in the response data does not match the download version information associated with upgrade, the lighting system controller proceeds to act 836, as discussed above.

In act 840, the lighting system controller examines the upgrade response to determine if the lighting controller upgraded the download module successfully. If so, the lighting system controller proceeds to act 844. If not, the lighting system controller proceeds to act 842.

In act 842, the lighting system controller reports an upgrade failure to the external entity that requested the upgrade. The upgrade failure may include an indication of the selected upgrade and lighting controller, as well as an indication as to the cause of the upgrade failure. Conversely, in act 844, the lighting system controller reports upgrade success to the external entity that requested the upgrade. The upgrade success may include an indication of the selected upgrade and lighting controller. Process 800 ends at 846.

Upon completion of process 800, a lighting controller upgrade having multiple upgrade dependencies has been installed on one or more lighting controllers. Processes in accord with process 800 allow external entities to deploy upgrades with complex interdependences to lighting controllers without having detailed knowledge of the components involved in the upgrade. Thus processes in accord with process 800 ease the administrative burden associated with configuration management of lighting control systems.

Each of processes 400 through 800 depicts one particular sequence of acts in a particular example. The acts included in each of these processes may be performed by, or using, one or more lighting system controllers as discussed herein. Some acts are optional and, as such, may be omitted in accord with one or more examples. Additionally, the order of acts can be altered, or other acts can be added, without departing from the scope of the apparatus and methods discussed herein. In addition, as discussed above, in at least one example, the acts are performed on a particular, specially configured machine, namely a lighting system controller configured according to the examples disclosed herein.

Having now described some illustrative aspects, it should be apparent to those skilled in the art that the foregoing is merely illustrative and not limiting, having been presented by way of example only. Similarly, aspects may be used to achieve other objectives. Numerous modifications and other illustrative examples are within the scope of one of ordinary skill in the art and are contemplated as falling within the scope of the apparatus and methods disclosed herein. In particular, although many of the examples presented herein involve specific combinations of method acts or system elements, it should be understood that those acts and those elements may be combined in other ways to accomplish the same objectives.

What is claimed is:

1. A method for upgrading a lighting controller using a lighting system controller coupled with the lighting controller via a network, the lighting system controller including memory and at least one processor coupled to the memory, the method comprising:

identifying, by the lighting system controller, a software component with a plurality of upgrade dependencies, the software component being natively executable by the lighting controller, each of the plurality of upgrade dependencies specifying a supporting software component upon which the software component is dependent;

providing, to the lighting controller by the lighting system controller, a request for configuration management information;

receiving, by the lighting system controller, a response to the request, the response including the configuration management information;

generating, by the lighting system controller, an upgrade plan based at least in part on the upgrade dependencies and the configuration management information; and executing, by the lighting system controller, the upgrade plan to install each supporting software component prior to installing the software component.

2. The method according to claim 1, wherein identifying the software component includes identifying at least one of a boot module for a lighting controller, a download module and an application module.

3. The method according to claim 1, wherein generating the upgrade plan includes generating an upgrade plan that includes an ordered sequence of upgrades.

4. The method according to claim 1, wherein executing the upgrade plan includes creating a single file that includes the software component and each supporting software component.

5. The method according to claim 4, further comprising providing the single file to the lighting controller via a network.

6. The method according to claim 1, wherein providing the request includes providing a request for configuration management information for each component installed in the lighting controller.

7. The method according to claim 6, wherein generating the upgrade plan includes generating an upgrade plan based at least in part on the upgrade dependencies and the response.

8. The method according to claim 1, wherein providing the request includes providing a request for configuration management information for a subset of components installed in the lighting controller.

9. A lighting system controller comprising:

a network interface;

a memory; and a controller coupled to the network interface and the memory and configured to:

identify a software component with a plurality of upgrade dependencies, the software component being natively executable by a lighting controller coupled with the lighting system controller via the network interface, each of the plurality of upgrade dependencies specifying a supporting software component upon which the software component is dependent;

provide, to the lighting controller, a request for configuration management information;

receive a response to the request, the response including the configuration management information;

generate an upgrade plan based at least in part on the upgrade dependencies and the configuration management information; and execute the upgrade plan to install each supporting software component prior to installing the software component.

10. The lighting system controller according to claim 9, wherein the controller configured to identify the software component is further configured to identify at least one of a boot module, a download module and an application module.

11. The lighting system controller according to claim 9, wherein the controller configured to generate the upgrade plan is further configured to generate an upgrade plan that includes an ordered sequence of upgrades.

12. The lighting system controller according to claim 9, wherein the controller configured to execute the upgrade plan is further configured to create a single file that includes the software component and each supporting software component.

13. The lighting system controller according to claim 12, wherein the controller is further configured to provide the single file to the lighting controller via a network.

14. The lighting system controller according to claim 9, wherein the request includes a request for configuration management information for each component installed in the lighting controller.

15. The lighting system controller according to claim 14, wherein the controller is further configured to receive a response to the request and wherein the controller configured to generate the upgrade plan is further configured to generate an upgrade plan based at least in part on the upgrade dependencies and the response.

16. The lighting system controller according to claim 9, wherein the request includes a request for configuration management information for a subset of components installed in the lighting controller.

17. The lighting system controller according to claim 9, wherein the controller is further configured to report a result of executing the upgrade plan, the result indicating either success or failure.

18. The method according to claim 8, wherein receiving the response includes receiving a response including configuration management information for the subset.

19. The lighting system controller according to claim 14, wherein the response includes configuration management information for the subset.

20. A non-transitory computer readable medium having stored thereon sequences of instruction for upgrading a lighting controller coupled with a lighting system controller via a network, the sequences of instruction including instructions that instruct at least one processor of the lighting system controller to:

identify a software component with a plurality of upgrade dependencies, the software component being natively executable by the lighting controller, each of the plurality of upgrade dependencies specifying a supporting software component upon which the software component is dependent;

provide, to the lighting controller, a request for configuration management information;

receive a response to the request, the response including the configuration management information;

generate an upgrade plan based at least in part on the upgrade dependencies and the configuration management information; and execute the upgrade plan to install each supporting software component prior to installing the software component.

* * * * *